(12) United States Patent
Simonov et al.

(10) Patent No.: US 11,984,105 B2
(45) Date of Patent: May 14, 2024

(54) SYSTEMS AND METHODS FOR FAN NOISE REDUCTION DURING BACKUP

(71) Applicant: Acronis international GmbH, Schaffhausen (CH)

(72) Inventors: Vladimir Simonov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 96 days.

(21) Appl. No.: 17/337,902

(22) Filed: Jun. 3, 2021

(65) Prior Publication Data

US 2021/0286682 A1    Sep. 16, 2021

Related U.S. Application Data

(60) Provisional application No. 63/063,750, filed on Aug. 10, 2020.

(51) Int. Cl.
*G10K 11/02* (2006.01)
*G06F 11/14* (2006.01)
*G06F 11/30* (2006.01)

(52) U.S. Cl.
CPC .......... *G10K 11/02* (2013.01); *G06F 11/1458* (2013.01); *G06F 11/1461* (2013.01); *G06F 11/3058* (2013.01); *G06F 2201/84* (2013.01)

(58) Field of Classification Search
CPC . G10K 11/02; G06F 11/1458; G06F 11/1461; G06F 11/3058; G06F 2201/84; G06F 11/1466; G06F 2201/81

USPC .......................................................... 714/699
See application file for complete search history.

(56) References Cited

U.S. PATENT DOCUMENTS

| | | | | |
|---|---|---|---|---|
| 6,182,191 | B1* | 1/2001 | Fukuzono | G11B 27/328 711/158 |
| 10,340,737 | B2* | 7/2019 | Jung | H05K 7/20209 |
| 10,888,022 | B2* | 1/2021 | Chen | G06F 1/20 |
| 2004/0222908 | A1* | 11/2004 | MacDonald | G10K 11/1785 341/144 |
| 2011/0090087 | A1* | 4/2011 | Berke | G06F 1/206 340/584 |
| 2013/0138901 | A1* | 5/2013 | Cordero | G06F 11/1666 711/E12.103 |
| 2014/0369461 | A1* | 12/2014 | Joshi | A61B 6/4488 250/336.1 |
| 2017/0047784 | A1* | 2/2017 | Jung | G06F 1/26 |

(Continued)

*Primary Examiner* — James C Kerveros
(74) *Attorney, Agent, or Firm* — ArentFox Schiff LLP; Michael Fainberg

(57) ABSTRACT

Disclosed herein are systems and method for minimizing fan noise during a data backup. In one exemplary aspect, a method may comprise initiating, at a computing device, a data backup at a first backup rate, wherein the computing device comprises a fan that regulates an internal temperature of the computing device. The method may comprise calculating a noise level of the fan. The method may comprise comparing the noise level to a threshold noise level. In response to determining that the noise level exceeds the threshold noise level based on the comparison, the method may comprise reducing a backup rate of the data backup to a second backup rate, such that the noise level equals the threshold noise level. The method may comprise performing the data backup at the second backup rate.

16 Claims, 3 Drawing Sheets

(56) References Cited

U.S. PATENT DOCUMENTS

2019/0325899 A1\* 10/2019 Dehghani ............... G10L 25/21
2021/0149465 A1\* 5/2021 Hiltner .................... G06F 1/206

\* cited by examiner

SYSTEMS AND METHODS FOR FAN NOISE REDUCTION DURING BACKUP

CROSS-REFERENCE TO RELATED APPLICATIONS

This application claims the benefit of U.S. Provisional Application No. 63/063,750, filed Aug. 10, 2020, which is herein incorporated by reference.

FIELD OF TECHNOLOGY

The present disclosure relates to the field of data backup, and, more specifically, to systems and methods for minimizing fan noise during a data backup.

BACKGROUND

In a business environment, computers typically utilize 5-10% of CPU power. Because of this underload, the fan inside a given device does not activate very often. Data backups may, however, utilize almost all available CPU power. If a backup lasts a significant amount of time (e.g., more than 5-10 minutes), the motherboard warms up, and the fan activates or increases rotation speed.

In modern times, as the amount of data being stored and accessed is increasing, the frequency of performing data backups and the size of data backups is also increasing. For example, as a protective measure against cyber security attacks, snapshots of hard drives are generated and uploaded to servers (e.g., of cloud services) periodically. Depending on the amount of changes between consecutively-uploaded snapshots of a given computer, the size of the backups can be quite large. As a result, fans of a computer may be used now more than ever. The frequent usage of a fan may shorten the lifespan of the fan. As the fan ages, its ability to cool off other hardware components of a device may worsen, causing the lifespan of the other hardware components to shorten as well. This causes a cycle in which the degradation of the hardware components requires a more frequent usage of the fan, and the more frequent usage degrades the fan further. While the user ultimately witnesses the long-term effect of this in the form of a slower and warmer device, the noise produced by the fan is an immediate outcome.

Fan noise is an integral part of the user experience for any device. Fans are often capable of running at different speeds, and even though running fans at their maximum speed is better for the longevity of the other hardware components, the noise produced at high speeds can be bothersome for users. The noise may also drown out the audio output of the device, for example, thus working against the performance of a device's speakers. As a result, running fans at maximum speeds is used as a last-resort depending on the internal temperature of the device.

Some backup applications have options that limit the maximum CPU power consumed by backup process. This approach is not optimal because the exact relation between consumed CPU power and fan noise is different across devices. This drawback becomes much more important in group backup plans where a single plan indicating backup process settings is created for many different devices. In this case, the same value of maximum CPU power limit may be too low for one type of device and too high for other devices. For the former, the backup process becomes slower than it can be, and for the latter, the backup process causes significant fan noise.

There is therefore a need to properly regulate data backups such that they are both performed as quickly as possible and minimize fan noise.

SUMMARY

Aspects of the disclosure describe methods and systems for minimizing fan noise during a data backup. In one exemplary aspect, a method may comprise initiating, at a computing device, a data backup at a first backup rate, wherein the computing device comprises a fan that regulates an internal temperature of the computing device. The method may comprise calculating a noise level of the fan. The method may comprise comparing the noise level to a threshold noise level. In response to determining that the noise level exceeds the threshold noise level based on the comparison, the method may comprise reducing a backup rate of the data backup to a second backup rate, such that the noise level equals the threshold noise level. The method may comprise performing the data backup at the second backup rate.

In some aspects, in response to determining that the noise level is less than the threshold noise level based on the comparison, the method may comprise increasing the backup rate of the data backup to a third backup rate, such that the noise level equals the threshold noise level, and performing the data backup at the third backup rate.

In some aspects, calculating the noise level comprises receiving, from a microphone, an audio clip capturing sound originating from the computing device, filtering the audio clip to extract sound produced solely from the fan, and determining a sound power level of the filtered audio clip, wherein the noise level comprises the sound power level.

In some aspects, calculating the noise level comprises determining a rotational speed of the fan, and estimating the noise level based on the rotational speed of the fan, an age of the fan, and a type of the computing device.

In some aspects, calculating the noise level comprises determining the internal temperature of the computing device, and estimating the noise level based on the internal temperature, an age of the fan, and a type of the computing device.

In some aspects, subsequent to completion of the data backup, the method may comprise initiating, at the computing device, another data backup at the second backup rate.

In some aspects, subsequent to completion of the data backup, the method may comprise recording, in a database, attributes of the computing device and the data backup, wherein the database comprises data backup rates for a plurality of computing devices and respective attributes of the plurality of computing devices. The method may comprise initiating, at a different computing device, another data backup at the second backup rate in response to determining that attributes of the different computing device and the data backup correspond to the attributes of the computing device and the data backup.

In some aspects, the method may comprise determining the threshold noise level based on a user profile being accessed on the computing device, wherein the computing device provides access to a plurality of user profiles and each respective user profile has an associated threshold noise level.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for minimizing fan noise during a data backup. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
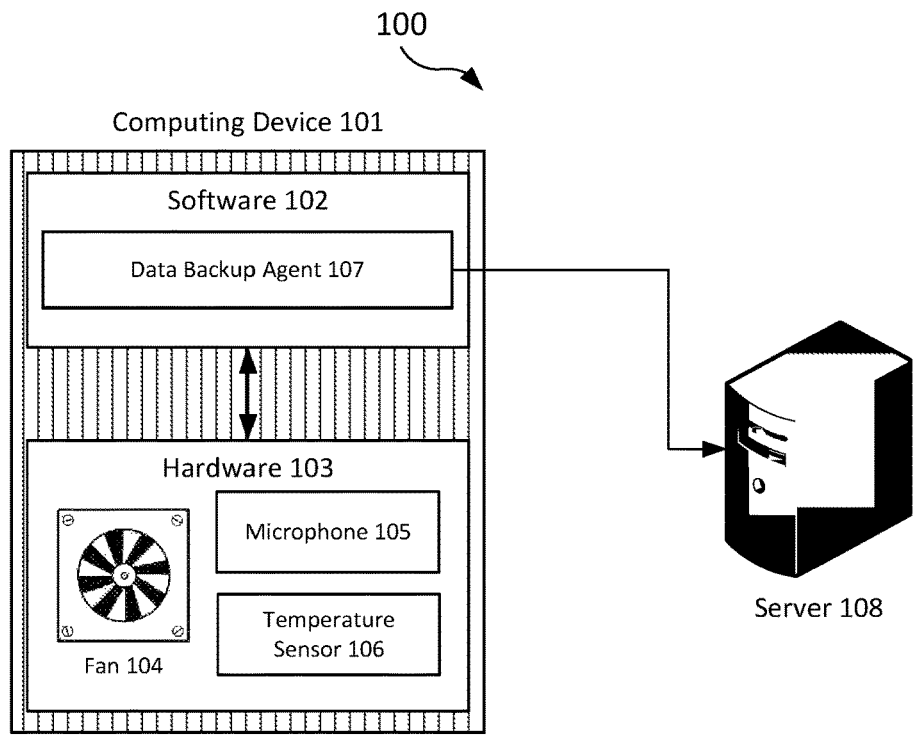
FIG. 1 is a block diagram illustrating a system for minimizing fan noise during a data backup.

FIG. 1 is a block diagram illustrating system 100 for minimizing fan noise during a data backup, in accordance with aspects of the present disclosure. In system 100, computing device 101 communicates with server 108 to upload/download data. In some aspects, computing device 101 may be a computer, a smartphone, a smart TV, a notebook, or any device that is capable of uploading data to a different device and regulating internal temperature with an external or internal fan.

Computing device 101 comprises two portions: software 102 and hardware 103. For simplicity, only the hardware components of particular interest are depicted in FIG. 1, namely, fan 104, microphone 105, and temperature sensor 106. Components not depicted are further described in FIG. 4, which depicts computer system 20 (interchangeable with computing device 101). Software 102 comprises data backup agent 107, which may be a module configured to collect data stored on computing device 101 (e.g., in memory) and upload it to server 108. Data backup agent 107 may further take actions in association with the data upload/backup to minimize fan noise produced by fan 104 during a data upload/backup. The upload/download process between computing device 101 and server 108 may take place over a wide area network (e.g., the Internet) or a local area network. In some aspects, the upload/download is performed wirelessly (e.g., using Wi-Fi) and in other aspects, the upload/download occurs over a wired connection (e.g., Ethernet cables).

In terms of temperature regulation for a typical computer, a safe operational limit for a CPU may be up to 60 degrees Celsius. If the heat is not properly removed from the internal structure of computing device 101, the temperature may raise well above this threshold, ultimately causing the processor to burn out. Fan 104 prevents this by reducing the internal temperature of computing device 101. If computing device 101 has a case, fan 104 may be a case fan that is physically located on the side of computing device 101. As a case fan, fan 104 blows hot air out of the case and introduces cool air inside. Fan 104 may be a CPU fan that is located on top of the processor of computing device 101 and blows hot air off the processor. Fan 104 may be a power supply fan that is located inside a power supply and blows hot air out of the power supply of computing device 101. Fan 104 may also be a video card fan that is located on a video card of computing device 101 and prevents video cards from overheating. In some aspects, fan 104 represents any combination of the different types of fans described above.

Because there are so many different fans that can potentially be in the same device, when they rotate at high speeds, a significant amount of noise may be produced. In addition to rotational speed, there are other factors that can contribute to fan noise. For example, as a fan ages, dust, pet hair, lint, etc., may accumulate on the fan and prevent efficient movement. In addition, parts that make up the fan can get loose or wear out, thus increasing vibrations and noise.

The motherboard of computing device 101 comprises hardware monitoring circuitry, which can be configured by a user (e.g., through BIOS or third-party software) to perform fan control. Fan control is the management of the rotational speed of fan 104. Fan control mechanisms balance the cooling capability and noise generated by fan 104. Simply turning on computing device may activate fan 104 to run continuously. As the internal temperature of computing device 101 rises (captured by temperature sensor 106), pulse-width modulation controllers in computing device 101 may automatically increase the revolutions per minute of fan 104. This allows the fan to push more air out of computing device 101 and in turn produces more noise. There may be multiple temperature sensors 106 in computing device 101. For example, temperature sensor 106 may be inside the CPU chip or on a graphics card inside computing device 101. Each fan 104 may adjust rotation in accordance with the temperature readings of a particular temperature sensor.

In some aspects, the features of the present disclosure may be activated by the user that initiates a data backup. For example, a system administrator or an end user may select a "comfort backup" option when configuring a backup plan for computing device 101 via data backup agent 107. In an exemplary aspect, data backup agent 107 initiates, at computing device 101, a data backup to store data on server 108. The data backup may initially be performed at a first backup rate. For example, the first backup rate may be an upload speed of 10 Mbps which copies 10 Mb of data on computing device 101 to server 108 per second.

Having established how fan 104 operates, the next consideration is the amount of noise that fan 104 produces. Because the noise of fan 104 is what the present disclosure focuses on minimizing, the sound power level (which may be measured in decibels) is important. Accordingly, data backup agent 107 calculates a noise level of fan 104. In some aspects, this can be determined using microphone 105. Microphone 105 may be built in to computer device 101, or may be an external component that is connected to computer device 101 (e.g., via a USB connection). Microphone 105 may pick up the sound of the operating fan and thus can be used to monitor whether the sound is too loud.

More specifically, data backup agent 107 may receive, from microphone 105, an audio clip capturing sound originating from computing device 101. Because the audio clip may also feature other noises that are not coming from fan 104 (e.g., ambient sounds from the environment that computing device 101 is in), the audio clip needs to be filtered. Data backup agent 107 filters the audio clip to extract sound produced solely from fan 104 (e.g., removes typing noises, speech, etc.) and determines a sound power level of the filtered audio clip, wherein the noise level comprises the sound power level. For example, the noise level of fan 104 may be 26 dB (A) based on the determination. The filtration may utilize any audio filtering techniques involving sound classification (e.g., voice recognition).

In some aspects, microphone 105 may not be available for use and as a result, data backup agent 107 calculates the noise level by approximating the noise level based on other measurable attributes of computing device 101. For example, data backup agent 107 may utilize the rotational speed of fan 104. As discussed previously, the rotational speed of fan 104 can be determined through the BIOS of computing device 101. In some aspects, data backup agent 107 may further determine the age of fan 104 (or computing device 101, if fan 104 was not replaced since computing device 101 was built). Data backup agent 107 may also determine a model of the computing device 101. Suppose that computing device 101 is a 2015 Apple Macbook Pro and the age of fan 104 inside the device is 5 years. Data backup agent 107 may retrieve a table that is specific to 5 year old Apple Macbook Pros that maps the rotational speed of fan 104 to a noise level produced by fan 104. Thus, if the rotational speed of fan 104 is 5000 revolutions per minute (rpm), data backup agent 107 may determine, from the table, that the noise level is 26 dB (A).

In some aspects, data backup agent 107 may have access to a plurality of tables, where each table is associated with a particular device of a particular aged fan/device. The data in the tables may be used as training/testing data in a machine learning regression algorithm that outputs a noise level based on any input age and rotational speed.

In some aspects, calculating the noise level comprises determining the internal temperature of computing device 101. The internal temperature of computing device 101 is dependent on several factors, including: the CPU usage, the amount of time the CPU has been used, the age of computing device 101/fan 104, and the external temperature. Data backup agent 107 may determine the internal temperature using temperature sensor 106. Suppose that the internal temperature of a 2015 Macbook Pro is 40 degrees Celsius. If for some reason the rotational speed of fan 104 cannot be determined, data backup agent 107 may estimate the rotational speed based on the internal temperature. Certain devices have default fan controls that adjust rotational speeds of fans based on an internal temperature. For example, at 40 degrees Celsius, the 2015 Macbook Pro may be configured to set the rotational speed of its internal fan to 5000 rpm. Using the internal temperature, the age of fan 104, and the type of computing device 101 (e.g., model of computing device 101), data backup agent 107 may estimate the noise level (e.g., 26 dB (A)). In particular, data backup agent 107 may refer to another table that maps internal temperature of a particular device to its default rotational speed set by the manufacturer. Using the rotational speed, data backup agent 107 may refer to the table mentioned above to calculate a noise level.

Subsequent to determining the noise level, data backup agent 107 may compare the noise level to a threshold noise level. The threshold noise level represents the maximum amount of noise that should be generated by fan 104, and may be specific to a user. For example, several users may use the same computing device 101 and there may be multiple user profiles on computing device 101. Depending on which user profile is logged onto computing device 101, a certain threshold noise level may be set.

Suppose that a particular user does not want the noise level of fan 104 to be more than 20 dB (A). While that user is accessing computing device 101, data backup agent 107 may periodically (e.g., once every 30 seconds) calculate the noise level and compare it against the threshold noise level. In response to determining that the noise level (e.g., 26 dB (A)) exceeds the threshold noise level (e.g., 20 dB (A)) based on the comparison, data backup agent 107 may reduce a backup rate of the data backup (e.g., 10 Mbps) to a second backup rate (e.g., 5 Mbps), such that the noise level equals the threshold noise level. In this example, the noise may be too loud for the user's liking. Because the internal temperature of computing device 101 is connected to the usage of computing device 101's CPU, reducing the CPU usage may decrease the internal temperature and slow down fan 104. In some aspects, data backup agent 107 may iteratively decrease the backup rate (e.g., by 0.5 Mbps), begin performing the data backup at the adjusted backup rate, calculate the noise level, and re-compare the new noise level to the threshold noise level. The use of iterative decrements/increments is important because other processes and threads may be utilizing the CPU of computing device 101. As the usage of those processes and threads changes, data backup agent 107 fine tunes the backup rate of the data backup to ensure that the noise level of fan 104 does not exceed the threshold noise level. In some cases, this may require postponing the data backup altogether (e.g., set the backup rate to 0 Mbps and monitor noise level until the noise level becomes lower than the threshold noise level). In some aspects, data backup agent 107 may measure the noise level of computing device 101 and only begin the data backup in response to determining that the initial noise level is less than the threshold noise level.

In some aspects, data backup agent 107 may determine that the noise level is less than the threshold noise level based on the comparison. In response, data backup agent 107 may increase the backup rate of the data backup to a third backup rate, such that the noise level equals the threshold noise level. Data backup agent 107 may also increase the backup rate increments to ensure that the backup rate is not increased to an extent that activates high rotational speeds in fan 104, which in turn drive the noise level past the threshold noise level.

In some aspects, the increments and decrements are proportional to the difference between the noise level and the threshold noise level. For example, if the difference is 6 dB (A), the decrement may be 1 Mbps. The noise level may then decrease until the new difference is 4 dB (A). In some aspects, the decrement may be kept constant. Accordingly, another decrement of 1 Mbps occurs. In other aspects, the decrement adjusts again. For example, the new decrement may be 0.67 Mbps (i.e., because the difference changed by 33%, the decrement is changed by 33%).

At a certain point in time, the difference between the noise level and the threshold noise level will reach 0 dB (A). Data backup agent 107 then records in memory of computing device 101, the current backup rate at this point and attributes of the computing device and data backup. These attributes may include the CPU usage percentage at that point, the names of the processes and threads running at that point, the model of computing device 101, etc. The current backup rate at that point represents the fastest backup rate possible with fan noise minimized. Thus, subsequent to the completion of the data backup, data backup agent 107 records the information described so that the backup rate can be set as the initial backup rate when computing device 101 is in the same situation (i.e., same CPU usage, same processes and threads being active, etc.) during a future data backup.

Although one approach to fan noise control may involve reducing the fan rotational speed directly, this may lead to heat damage. For example, if the data backup is pushing the computing device to its processing limits, reducing fan rotational speed will further damage the device. By reducing the backup rate, which affects the CPU usage by a backup program, the fan noise can be reduced in a safe manner.

Figure 2:
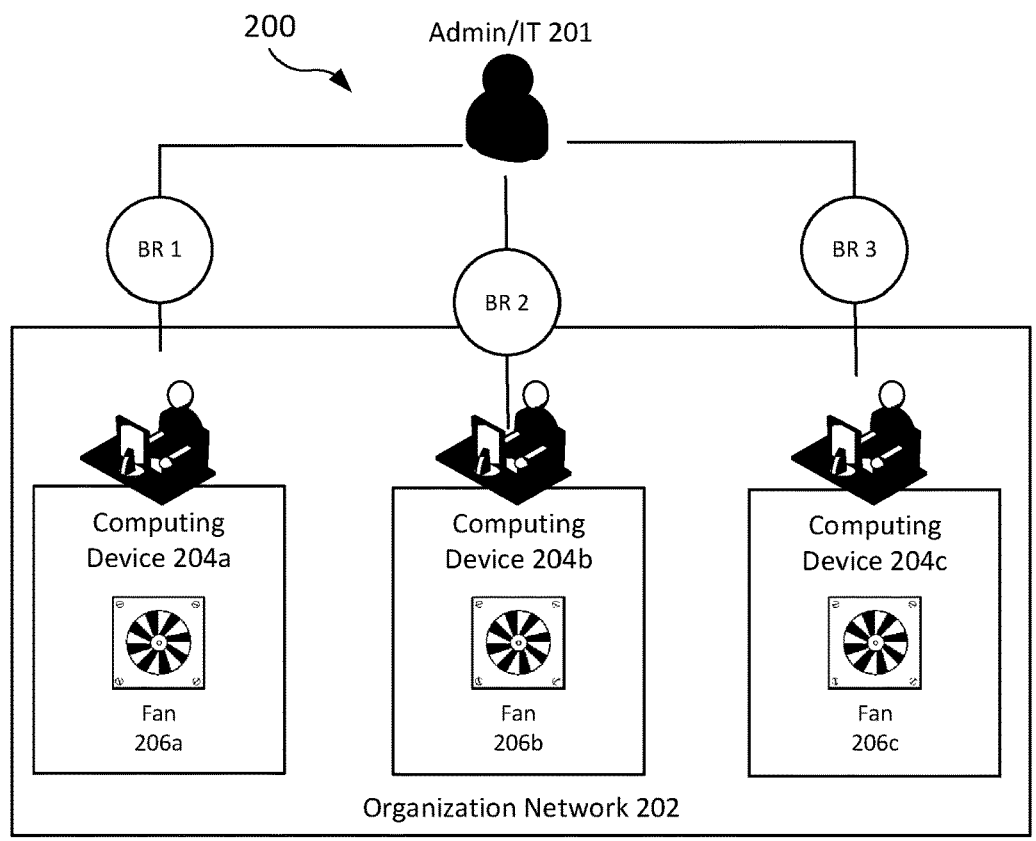
FIG. 2 is a block diagram illustrating a system for minimizing fan noise across a plurality of computing devices in a network.

FIG. 2 is a block diagram illustrating system 200 for minimizing fan noise across a plurality of computing devices in a network. Suppose that computing device 204a, 204b, and 204c are devices such as laptops or desktops issued to employees of a company. Each computing device has a fan, namely, fan 206a 206b, and 206c. Each computing device is part of organization network 202 that may be established by admin/IT 201. For example, the IT department of the company may release updates (e.g., to applications, operating system, drivers, etc.) to each computing device that is part of network 202.

Even if each computing device is identical in hardware attributes (e.g., each computing device 204a-c may be the same model laptop) and some software attributes (e.g., applications, operating system version, etc.), depending on the files that an employee accesses and the frequency and longevity of use per computing device, fans 206a-c may each activate at various points in time. For example, if computing device 204a is used every day for at least 5 hours and computing device 204b is accessed once a week for 3 hours, computing device 204a may experience more wear than computing device 204b. Accordingly, computing device 204a may overheat faster and will require quicker activation of fan 206a when compared to fan 206b. It is also possible that fan 206a may be louder than fan 20b and will revolve for a longer period of time to cool its device.

In conventional systems, admin 201 may set a global backup rate for each computing device to back up data that is independent of fan noise. In the present disclosure, however, admin 201 individually determine a backup rate to assign to each computing device. As shown in FIG. 2, computing device 204a is assigned backup rate 1 (BR 1), computing device 204b is assigned backup rate 2 (BR 2), and computing device 204c is assigned backup rate 3 (BR 3).

In some aspects, data backup agent 107 may exist on a managing device of admin 201 and may records the attributes and the backup rate in a database comprising data backup rates for a plurality of computing devices (e.g., 204a-c) and respective attributes of the plurality of computing devices (e.g., hardware attributes, applications, drivers, memory usage, age, usage frequency, etc.). Using the database, data backup agent 107 of admin 201 may initiate, at a different computing device (e.g., a new device or an existing device 204a-c), another data backup at a particular backup rate in response to determining that attributes of the different computing device and the data backup correspond to the attributes of computing device 101 and the completed data backup. In other words, if the attributes of computing device 204a and another computing device 204b are comparable, BR 1 and BR 2 may be equal. Admin 201 may determine comparability by selecting a certain number of attributes and deciding whether a threshold number of them (e.g., at least 80%) match. By using this technique, admin 201 does not have to determine a new backup rate for each device and waste computational resources.

Figure 3:
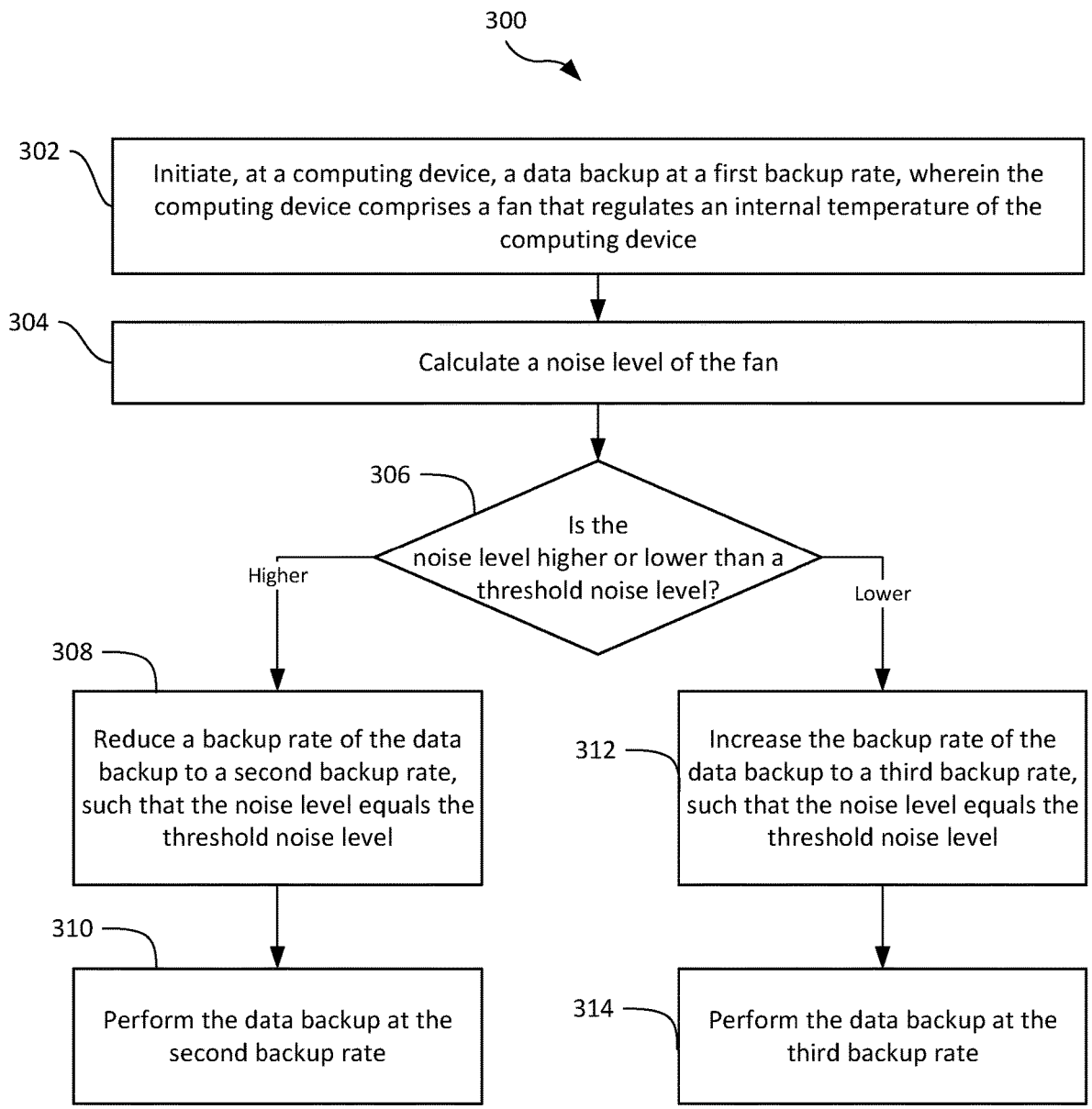
FIG. 3 illustrates a flow diagram of a method for minimizing fan noise during a data backup.

FIG. 3 illustrates a flow diagram of method 300 for minimizing fan noise during a data backup. At 302, data backup agent 107 initiates, at computing device 101, a data backup at a first backup rate, wherein the computing device comprises a fan that regulates an internal temperature of the computing device. At 304, data backup agent 107 calculates a noise level of the fan. At 306, data backup agent 107 determines whether the noise level is higher or lower than a threshold noise level. In response to determining that the noise level is higher, method 300 proceeds to 308, where data backup agent 107 reduces a backup rate of the data backup to a second backup rate, such that the noise level equals the threshold noise level. At 310, data backup agent 107 performs the data backup at the second backup rate. However, if at 306, data backup agent 107 determines that the noise level is lower than the threshold noise level, method 300 proceeds to 312, where data backup agent 107 increases the backup rate of the data backup to a third backup rate, such that the noise level equals the threshold noise level. At 314, data backup agent 107 performs the data backup at the third backup rate. It should be noted that if the noise level is equal to the threshold noise level, the first backup rate may be maintained throughout the data backup.

Figure 4:
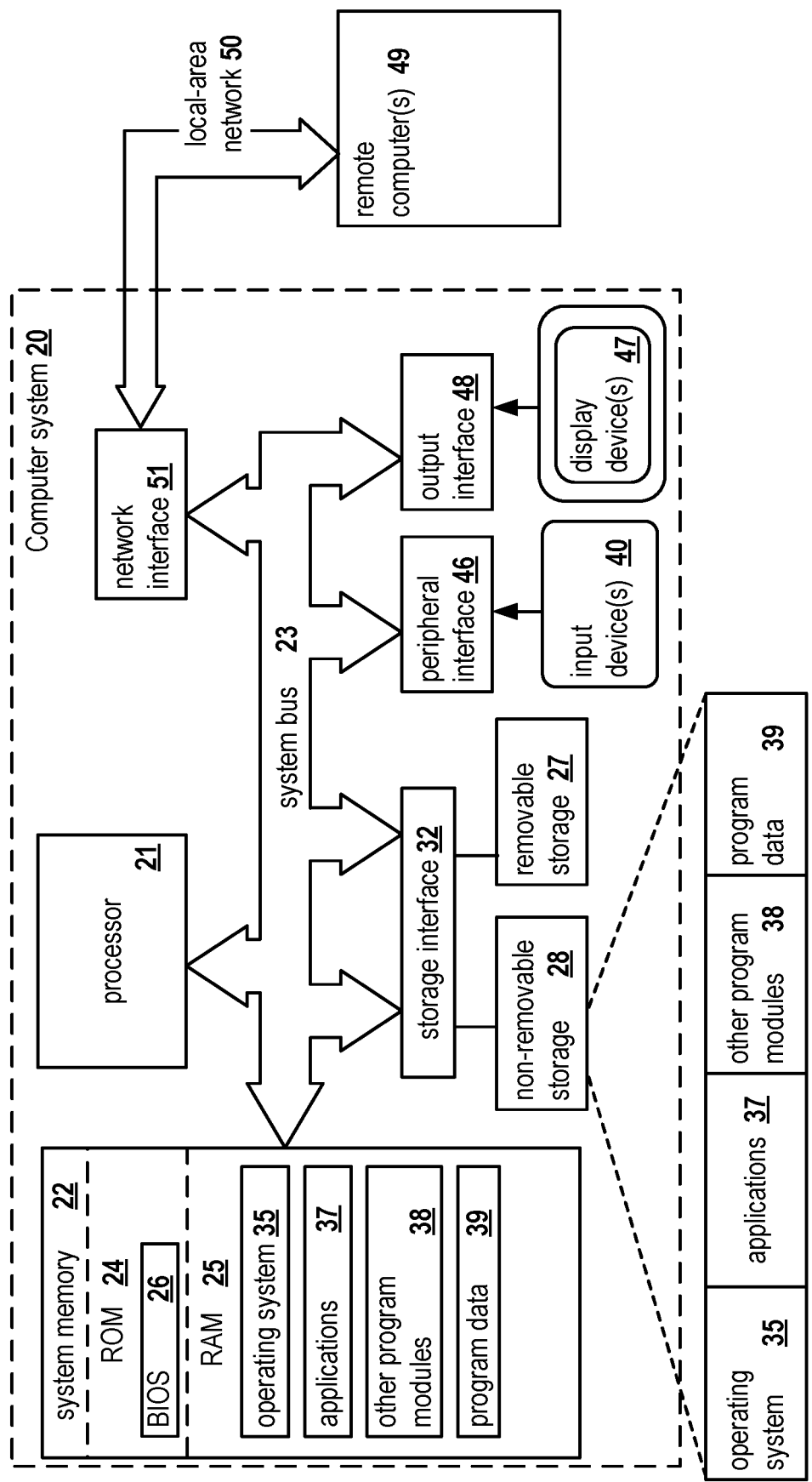
FIG. 4 presents an example of a general-purpose computer system on which aspects of the present disclosure can be implemented.

FIG. 4 is a block diagram illustrating a computer system 20 on which aspects of systems and methods for minimizing fan noise during a data backup may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices. Computer system 20 represents computing device 101 and may also represent server 108. It should be noted that the hardware components described in FIG. 1, namely, fan 104, microphone 105, and temperature sensor 106 are included in computer system 20 but are not explicitly mentioned to avoid repetition. These components may be connected to system bus 23.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for minimizing fan noise during a data backup, the method comprising:
   initiating, at a computing device, a data backup at a first backup rate, wherein the computing device comprises a fan that regulates an internal temperature of the computing device;
   iteratively adjusting a backup rate of the data backup until a noise level of the fan meets a threshold noise level, by:
      calculating the noise level of the fan by:
         determining a rotational speed of the fan; and
         estimating the noise level based on the rotational speed of the fan, an age of the fan, and a type of the computing device;
      comparing the noise level to a threshold noise level;
      in response to determining that the noise level exceeds the threshold noise level based on the comparison, reducing the backup rate of the data backup by a first amount;
      in response to determining that the noise level is less than the threshold noise level, increasing the backup rate by the first amount; and
   performing the data backup at the adjusted backup rate.

2. The method of claim 1, wherein calculating the noise level further comprises:
   receiving, from a microphone, an audio clip capturing sound originating from the computing device;
   filtering the audio clip to extract sound produced solely from the fan; and
   determining a sound power level of the filtered audio clip, wherein the noise level comprises the sound power level.

3. The method of claim 1, wherein calculating the noise level further comprises:
   determining the internal temperature of the computing device; and
   estimating the noise level based on the internal temperature, the rotational speed, the age of the fan, and the type of the computing device.

4. The method of claim 1, further comprising:
   subsequent to completion of the data backup, initiating, at the computing device, another data backup at the adjusted backup rate.

5. The method of claim 1, further comprising:
   subsequent to completion of the data backup:
      recording, in a database, attributes of the computing device and the data backup, wherein the database comprises data backup rates for a plurality of computing devices and respective attributes of the plurality of computing devices; and
      initiating, at a different computing device, another data backup at the adjusted backup rate in response to determining that attributes of the different computing device and the data backup correspond to the attributes of the computing device and the data backup.

6. The method of claim 1, further comprising:
   determining the threshold noise level based on a user profile being accessed on the computing device, wherein the computing device provides access to a plurality of user profiles and each respective user profile has an associated threshold noise level.

7. A system for minimizing fan noise during a data backup, the system comprising:
   a fan that regulates an internal temperature of a computing device; and
   a hardware processor configured to:
      initiate, at a computing device, a data backup at a first backup rate;
      iteratively adjusting a backup rate of the data backup until a noise level of the fan meets a threshold noise level, by:
         calculating a noise level of the fan by:
            determining a rotational speed of the fan; and
            estimating the noise level based on the rotational speed of the fan, an age of the fan, and a type of the computing device;
         comparing the noise level to a threshold noise level;
         in response to determining that the noise level exceeds the threshold noise level based on the comparison, reducing the backup rate of the data backup by a first amount;

in response to determining that the noise level is less than the threshold noise level, increasing the backup rate by the first amount; and perform the data backup at the adjusted backup rate.

8. The system of claim 7, wherein the hardware processor is further configured to calculate the noise level by:

receiving, from a microphone, an audio clip capturing sound originating from the computing device;

filtering the audio clip to extract sound produced solely from the fan; and determining a sound power level of the filtered audio clip, wherein the noise level comprises the sound power level.

9. The system of claim 7, wherein the hardware processor is further configured to calculate the noise level by:

determining the internal temperature of the computing device; and estimating the noise level based on the internal temperature, the rotational speed, the age of the fan, and the type of the computing device.

10. The system of claim 7, wherein the hardware processor is further configured to:

subsequent to completion of the data backup, initiate, at the computing device, another data backup at the adjusted backup rate.

11. The system of claim 7, wherein the hardware processor is further configured to:

subsequent to completion of the data backup:

record, in a database, attributes of the computing device and the data backup, wherein the database comprises data backup rates for a plurality of computing devices and respective attributes of the plurality of computing devices; and initiate, at a different computing device, another data backup at the adjusted backup rate in response to determining that attributes of the different computing device and the data backup correspond to the attributes of the computing device and the data backup.

12. The system of claim 7, wherein the hardware processor is further configured to:

determine the threshold noise level based on a user profile being accessed on the computing device, wherein the computing device provides access to a plurality of user profiles and each respective user profile has an associated threshold noise level.

13. A non-transitory computer readable medium storing thereon computer executable instructions for minimizing fan noise during a data backup, including instructions for:

initiating, at a computing device, a data backup at a first backup rate, wherein the computing device comprises a fan that regulates an internal temperature of the computing device;

iteratively adjusting a backup rate of the data backup until a noise level of the fan meets a threshold noise level, by:

calculating the noise level of the fan by:

determining a rotational speed of the fan; and estimating the noise level based on the rotational speed of the fan, an age of the fan, and a type of the computing device;

comparing the noise level to a threshold noise level;

in response to determining that the noise level exceeds the threshold noise level based on the comparison, reducing the backup rate of the data backup by a first amount;

in response to determining that the noise level is less than the threshold noise level, increasing the backup rate by the first amount; and performing the data backup at the adjusted backup rate.

14. The non-transitory computer readable medium of claim 13, wherein calculating the noise level further comprises:

receiving, from a microphone, an audio clip capturing sound originating from the computing device;

filtering the audio clip to extract sound produced solely from the fan; and determining a sound power level of the filtered audio clip, wherein the noise level comprises the sound power level.

15. The method of claim 1, further comprising iteratively adjusting the backup rate of the data backup to maintain the noise level of the fan at the threshold noise level.

16. The method of claim 1, wherein the first amount is proportional to a difference between the noise level and the threshold noise level.

\* \* \* \* \*